(12) United States Patent
Sakamoto

(10) Patent No.: US 12,534,551 B2
(45) Date of Patent: Jan. 27, 2026

(54) SLURRY COMPOSITION

(71) Applicant: SEKISUI CHEMICAL CO., LTD., Osaka (JP)

(72) Inventor: Ryou Sakamoto, Yamaguchi (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 744 days.

(21) Appl. No.: 17/800,318

(22) PCT Filed: Mar. 17, 2021

(86) PCT No.: PCT/JP2021/010896
§ 371 (c)(1),
(2) Date: Aug. 17, 2022

(87) PCT Pub. No.: WO2021/193298
PCT Pub. Date: Sep. 30, 2021

(65) Prior Publication Data
US 2023/0084330 A1 Mar. 16, 2023

(30) Foreign Application Priority Data

Mar. 27, 2020 (JP) ................................ 2020-058265
Dec. 21, 2020 (JP) ................................ 2020-211437

(51) Int. Cl.
*C08F 118/08* (2006.01)
*C08F 216/06* (2006.01)
*C08K 3/08* (2006.01)
*H01G 4/30* (2006.01)

(52) U.S. Cl.
CPC .......... *C08F 118/08* (2013.01); *C08F 216/06* (2013.01); *C08K 3/08* (2013.01); *H01G 4/30* (2013.01); *C08K 2003/0818* (2013.01); *C08K 2003/0856* (2013.01); *C08K 2201/003* (2013.01); *C08K 2201/01* (2013.01)

(58) Field of Classification Search
CPC .............. C08F 118/08; C08F 216/06; C08K 2003/0818; C08K 2003/0856; C08K 2201/01; C08K 2201/003

USPC .......................................................... 524/435
See application file for complete search history.

(56) References Cited

U.S. PATENT DOCUMENTS

| 3,499,789 | A | * | 3/1970 | Delmore | ................ C08L 75/04 |
| | | | | | 428/524 |
| 4,499,789 | A | * | 2/1985 | Kuramochi | ......... F16H 61/0009 |
| | | | | | 74/606 R |
| 2005/0159545 | A1 | | 7/2005 | Mashiko et al. | |
| 2017/0037271 | A1 | | 2/2017 | Kobayashi et al. | |
| 2019/0292359 | A1 | * | 9/2019 | Inoue | ..................... B32B 21/08 |

FOREIGN PATENT DOCUMENTS

| CN | 1630670 | 6/2005 |
| JP | 3043106 | 3/2000 |
| JP | 3110146 | 9/2000 |
| JP | 2014-198646 | 10/2014 |
| JP | 2018-165229 | 10/2018 |
| JP | 2018-165231 | 10/2018 |
| JP | 2018-165232 | 10/2018 |
| WO | 2015/141623 | 9/2015 |

OTHER PUBLICATIONS

International Search Report issued May 11, 2021 in International (PCT) Application No. PCT/JP2021/010896.

* cited by examiner

*Primary Examiner* — Ruiyun Zhang
(74) *Attorney, Agent, or Firm* — Wenderoth, Lind & Ponack, L.L.P.

(57) ABSTRACT

The present invention provides a slurry composition in which magnetic material powder has excellent dispersibility and excellent dispersion stability and which enables production of a sheet having high surface smoothness and high adhesiveness to substrates. Provided is a slurry composition containing: a polyvinyl acetal resin; magnetic material powder; and a Na ion, the slurry composition having a Na ion content of 1,000 to 3,000 µg/g relative to the polyvinyl acetal resin.

4 Claims, No Drawings

SLURRY COMPOSITION

TECHNICAL FIELD

The present invention relates to a slurry composition in which magnetic material powder has excellent dispersibility and excellent dispersion stability and which enables production of a sheet having high surface smoothness and high adhesiveness to substrates.

BACKGROUND ART

Polyvinyl acetal resins are excellent in toughness, film-forming properties, dispersion of inorganic powder (e.g., pigment) and organic powder, and adhesiveness to the surface to be coated. Polyvinyl acetal resins are thus used for applications such as ceramic green sheets and conductive pastes constituting multilayer ceramic capacitors, inks, coating materials, enamels for baking, and wash primers, for example.

In particular, a multilayer ceramic capacitor is typically produced through the following steps.

First, ceramic raw material powder is added to a binder resin such as polyvinyl butyral resin and uniformly mixed to prepare a slurry composition. The obtained slurry composition is applied to a release-treated surface of a support. The composition is subjected to heating or the like to remove solvent and other volatile components, and then separated from the support to prepare a ceramic green sheet. Next, the obtained ceramic green sheet is coated with a conductive paste by a method such as screen printing, where the conductive paste contains polyvinyl butyral resin or the like as a binder resin. Sheets obtained in this manner are stacked such that the ceramic green sheets and the conductive paste layers alternate with each other, and thermally pressure-bonded to prepare a laminate. The laminate is subjected to a debinding treatment and then fired to prepare a ceramic fired article, and external electrodes are sintered to the end surfaces of the ceramic fired article. Through these steps, a multilayer ceramic capacitor can be obtained.

Regarding the binder resin, Patent Literature 1 discloses a polyvinyl acetal resin obtained by generating acetic acid from residual sodium acetate in polyvinyl alcohol and using the obtained acetic acid as a catalyst to acetalize the polyvinyl alcohol. Patent Literature 1 discloses that using this polyvinyl acetal resin can prevent metal corrosion of peripheral equipment.

Patent Literature 2 discloses that using a polyvinyl acetal resin obtained by acetalizing a modified polyvinyl alcohol with acetaldehyde and butyraldehyde can increase the flexibility and the thermal fusing properties of the resulting sheet.

CITATION LIST

Patent Literature

Patent Literature 1: JP 3043106 B
Patent Literature 2: JP 3110146 B

SUMMARY OF INVENTION

Technical Problem

However, magnetic material powder such as ferrite has poor dispersibility. Using the polyvinyl acetal resin of Patent Literature 1 or 2 as a binder resin may result in a slurry composition in which magnetic material powder insufficiently disperses or settles over time, exhibiting poor dispersibility and poor dispersion stability. Moreover, using such a slurry composition may result in a sheet having poor surface smoothness. Such a slurry composition also has low adhesion to substrates, and tends to cause defects during processing of the molded sheet.

The present invention aims to provide a slurry composition in which magnetic material powder has excellent dispersibility and excellent dispersion stability and which enables production of a sheet having high surface smoothness and high adhesiveness to substrates.

Solution to Problem

The present invention relates to a slurry composition containing: a polyvinyl acetal resin; magnetic material powder; and a Na ion, the slurry composition having a Na ion content of 1,000 to 3,000 µg/g relative to the polyvinyl acetal resin.

The present invention is described in detail below.

As a result of intensive studies, the present inventor found out that using a polyvinyl acetal resin as a binder resin and adding a predetermined amount of Na ions can improve the dispersibility and the dispersion stability of magnetic material powder, making it possible to produce a sheet having high surface smoothness and high adhesiveness to substrates. The inventor thus completed the present invention.

The slurry composition of the present invention contains a polyvinyl acetal resin.

The presence of a polyvinyl acetal resin can improve the dispersibility of powder and adhesiveness to the surface to be coated.

The polyvinyl acetal resin preferably contains at least a hydroxy group-containing structural unit represented by the following formula (1), an acetal group-containing structural unit represented by the following formula (2), and an acetyl group-containing structural unit represented by the following formula (3).

[Chem. 1]

(1)

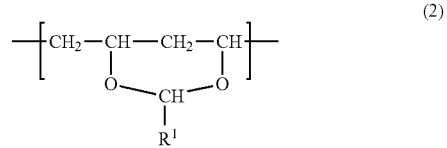

(2)

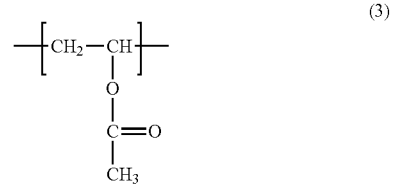

(3)

In the formula (2), R' represents a hydrogen atom or a C1-C20 alkyl group.

When $R^1$ in the formula (2) is a C1-C20 alkyl group, examples of the alkyl group include methyl, ethyl, n-propyl, isopropyl, n-butyl, iso-butyl, sec-butyl, tert-butyl, pentyl, hexyl, heptyl, 2-ethylhexyl, octyl, nonyl, decyl, undecyl, dodecyl, tridecyl, tetradecyl, pentadecyl, and octadecyl groups. Preferred among these are methyl and n-propyl groups.

In the polyvinyl acetal resin, the lower limit of the amount of the hydroxy group-containing structural unit represented by the formula (1) (hereinafter also referred to as "hydroxy group content") is preferably 43 mol %, more preferably 45 mol %, still more preferably 50 mol %, and the upper limit thereof is preferably 78 mol %, more preferably 75 mol %, still more preferably 70 mol %.

The hydroxy group content represents the proportion of the hydroxy group-containing structural unit represented by the formula (1) relative to all the monomer units constituting the main chain of the polyvinyl acetal resin.

The hydroxy group content can be measured by NMR, for example.

In the polyvinyl acetal resin, the lower limit of the amount of the acetal group-containing structural unit represented by the formula (2) (hereinafter also referred to as "acetal group content") is preferably 1 mol %, more preferably 2 mol %, still more preferably 6 mol %, and the upper limit thereof is preferably 50 mol %, more preferably 45 mol %, still more preferably 40 mol %.

The acetal group content within the above range can enhance the toughness of the resin.

The acetal group content represents the proportion of the acetal group-containing structural unit represented by the formula (2) relative to all the monomer units constituting the main chain of the polyvinyl acetal resin.

The acetal group content herein is calculated by counting acetalized two hydroxy groups because an acetal group of a polyvinyl acetal resin is obtained by acetalizing two hydroxy groups.

The acetal group content can be measured by NMR, for example.

In the polyvinyl acetal resin, the lower limit of the amount of the acetyl group-containing structural unit represented by the formula (3) (hereinafter also referred to as "acetyl group content") is preferably 1 mol %, more preferably 2 mol %, still more preferably 3 mol %, particularly preferably 6 mol %, and the upper limit thereof is preferably 20 mol %, more preferably 18 mol %, still more preferably 15 mol %.

The acetyl group content within the above range can enhance the toughness of the resin.

The acetyl group content represents the proportion of the acetyl group-containing structural unit represented by the formula (3) relative to all the monomer units constituting the main chain of the polyvinyl acetal resin.

The acetyl group content can be measured by NMR, for example.

The polyvinyl acetal resin may contain a structural unit containing an acid-modified group.

Examples of the acid-modified group include carboxyl, sulfonic acid, maleic acid, sulfinic acid, sulfenic acid, phosphoric acid, phosphonic acid, and amino groups, and salts thereof. Preferred among these is a carboxyl group.

The modified polyvinyl acetal resin having the structural unit containing an acid-modified group has better compatibility with an epoxy resin to achieve high mechanical strength.

The structural unit containing an acid-modified group may have a structure in which an acid-modified group as a side chain is directly bonded to a carbon atom constituting the main chain or a structure in which an acid-modified group as a side chain is bonded to a carbon atom constituting the main chain via an alkylene group.

The structural unit containing an acid-modified group may have a steric structure in which two acid-modified groups are bonded to the same carbon atom constituting the main chain or a steric structure in which one acid-modified group is bonded to a carbon atom constituting the main chain. Alternatively, the structural unit containing an acid-modified group may have a steric structure in which one acid-modified group is bonded to each of two adjacent carbon atoms constituting the main chain or a steric structure in which an acid-modified group is bonded to only one of two adjacent carbon atoms constituting the main chain. A preferred structure is a steric structure in which two acid-modified groups are bonded to the same carbon atom constituting the main chain or a steric structure in which one acid-modified group is bonded to each of two adjacent carbon atoms constituting the main chain. A more preferred structure is a steric structure in which two acid-modified groups are bonded to the same carbon atom constituting the main chain, because such a structure increases the steric hindrance and thereby widens the network structure of a cured product obtainable by combining the polyvinyl acetal resin and an epoxy resin, and as a result can improve the flexibility of the cured product to be obtained.

The structural unit containing an acid-modified group may have a steric structure in which acid-modified groups are bonded to carbon atoms constituting the main chain on one side (isotactic arrangement) or a steric structure in which acid-modified groups are bonded to carbon atoms constituting the main chain at alternate positions along the chain (syndiotactic arrangement). Moreover, it may have a steric structure in which the acid-modified groups are randomly bonded (atactic arrangement).

In the case where the structural unit containing an acid-modified group has a structure in which an acid-modified group is bonded to a carbon atom constituting the main chain via an alkylene group, the alkylene group is preferably a C10-C10 alkylene group, more preferably a C1-C5 alkylene group, still more preferably a C1-C3 alkylene group.

Examples of the C1-C10 alkylene group include linear alkylene groups, branched alkylene groups, and cyclic alkylene groups.

Examples of the linear alkylene groups include methylene, vinylene, n-propylene, tetramethylene, pentamethylene, hexamethylene, octamethylene, and decamethylene groups.

Examples of the branched alkylene groups include methyl methylene, methyl ethylene, 1-methyl pentylene, and 1,4-dimethyl butylene groups.

Examples of the cyclic alkylene groups include cyclopropylene, cyclobutylene, and cyclohexylene groups.

Preferred among these are linear alkylene groups, more preferred are methylene, vinylene, and n-propylene groups, and still more preferred are methylene and vinylene groups.

The lower limit of the average degree of polymerization of the polyvinyl acetal resin is preferably 200, and the upper limit thereof is preferably 5,000. The polyvinyl acetal resin having an average degree of polymerization within the above range can sufficiently enhance the mechanical strength of the resulting coating film. The lower limit of the average degree of polymerization is more preferably 300, and the upper limit thereof is more preferably 4,500.

The lower limit of the amount of the polyvinyl acetal resin in the slurry composition of the present invention is preferably 20% by weight, more preferably 25% by weight, and the upper limit thereof is preferably 65% by weight, more preferably 60% by weight.

The polyvinyl acetal resin may be produced by, for example, a method including polymerizing a monomer such as vinyl acetate to prepare a polyvinyl acetate resin, saponifying the polyvinyl acetate resin by adding an acid or alkali, subjecting the resulting polyvinyl alcohol resin to refining or the like to adjust its Na ion content, and acetalizing the polyvinyl alcohol resin.

The acetalization may be carried out by a known method, and is preferably carried out in a water solvent, a solvent mixture containing water and an organic solvent compatible with water, or an organic solvent.

The organic solvent compatible with water may be, for example, an alcoholic organic solvent.

Examples of the organic solvent include alcoholic organic solvents, aromatic organic solvents, aliphatic ester solvents, ketone solvents, lower paraffin solvents, ether solvents, amide solvents, and amine solvents.

Examples of the alcoholic organic solvents include methanol, ethanol, n-propanol, isopropanol, n-butanol, and tert-butanol.

Examples of the aromatic organic solvents include xylene, toluene, ethyl benzene, and methyl benzoate.

Examples of the aliphatic ester solvents include methyl acetate, ethyl acetate, butyl acetate, methyl propionate, ethyl propionate, methyl butyrate, ethyl butyrate, methyl acetoacetate, and ethyl acetoacetate.

Examples of the ketone solvents include acetone, methyl ethyl ketone, methyl isobutyl ketone, cyclohexanone, methyl cyclohexanone, benzophenone, and acetophenone.

Examples of the lower paraffin solvents include hexane, pentane, octane, cyclohexane, and decane.

Examples of the ether solvents include diethyl ether, tetrahydrofuran, ethylene glycol dimethyl ether, ethylene glycol diethyl ether, and propylene glycol diethyl ether.

Examples of the amide solvents include N,N-dimethylformamide, N,N-dimethylacetamide, N-methylpyrrolidone, and acetanilide.

Examples of the amine solvents include ammonia, trimethylamine, triethylamine, n-butylamine, di-n-butylamine, tri-n-butylamine, aniline, N-methylaniline, N,N-dimethylaniline, and pyridine.

These may be used alone or in admixture of two or more thereof. From the standpoint of the ability to dissolve resin and easy purification, particularly preferred among these are ethanol, n-propanol, isopropanol, and tetrahydrofuran.

The acetalization is preferably carried out in the presence of an acid catalyst.

The acid catalyst is not limited, and examples thereof include mineral acids such as sulfuric acid, hydrochloric acid, nitric acid, and phosphoric acid, carboxylic acids such as formic acid, acetic acid, and propionic acid, and sulfonic acids such as methanesulfonic acid, ethanesulfonic acid, benzenesulfonic acid, and p-toluenesulfonic acid. These acid catalysts may be used alone, or two or more types of compounds may be used in combination. Preferred among these are hydrochloric acid, nitric acid, and sulfuric acid, and particularly preferred is hydrochloric acid.

The aldehyde used for the acetalization may be an aldehyde having a C1-C10 acyclic aliphatic group, a C1-C10 cyclic aliphatic group, or a C1-C10 aromatic group. The aldehyde used may be a conventionally known aldehyde. The aldehyde used for the acetalization reaction is not limited, and examples thereof include aliphatic aldehydes and aromatic aldehydes.

Examples of the aliphatic aldehydes include formaldehyde, acetaldehyde, propionaldehyde, n-butyraldehyde, isobutyraldehyde, n-valeraldehyde, n-hexylaldehyde, 2-ethylbutyraldehyde, 2-ethylhexylaldehyde, n-heptylaldehyde, n-octylaldehyde, n-nonylaldehyde, n-decylaldehyde, and amylaldehyde.

Examples of the aromatic aldehydes include aromatic aldehydes such as benzaldehyde, cinnamaldehyde, 2-methylbenzaldehyde, 3-methylbenzaldehyde, 4-methylbenzaldehyde, p-hydroxybenzaldehyde, m-hydroxybenzaldehyde, phenylacetaldehyde, and β-phenylpropionaldehyde.

Cyclic multimers such as paraldehyde and metaldehyde may also be used.

These aldehydes may be used alone, or two or more types thereof may be used in combination. Preferred among these aldehydes are formaldehyde, acetaldehyde, butyraldehyde, 2-ethylhexylaldehyde, n-nonylaldehyde, and paraldehyde because they are excellent in acetalization reactivity and can give the resin to be prepared a sufficient internal plasticization effect to impart favorable flexibility. More preferred are formaldehyde, acetaldehyde, butyraldehyde, and paraldehyde because they can provide an adhesive composition particularly excellent in impact resistance and adhesiveness to metal.

The amount of the aldehyde to be added can be appropriately determined according to the acetal group content of the aimed polyvinyl acetal resin. In particular, it is preferred that the amount is 60 to 95 mol %, preferably 65 to 90 mol % relative to 100 mol % of the polyvinyl alcohol because the acetalization reaction can be efficiently carried out and unreacted aldehyde can be easily removed.

The slurry composition of the present invention contains magnetic material powder.

Examples of the magnetic material powder include metal particles, metal oxide particles, and metal nitride particles.

The magnetic material powder refers to a material capable of being magnetized. Typical examples thereof include diamagnetic materials, paramagnetic materials, and ferromagnetic materials. The magnetic material powder is preferably a ferromagnetic material.

Examples of metal particles used as the magnetic material powder include particles containing iron, particles containing cobalt, particles containing nickel, particles containing aluminum, and particles containing alloys containing these metals.

Examples of the alloys include Fe—Ni, Fe—Co, Fe—Cr, Fe—Si, Fe—Al, Fe—Cr—Si, Fe—Cr—Al, Fe—Al—Si, and Fe—Pt.

The metal oxide is preferably ferrite. Specific examples thereof include $MnFe_2O_4$, $CoFe_2O_4$, $NiFe_2O_4$, $CuFe_2O_4$, $ZnFe_2O_4$, $MgFe_2O_4$, $Fe_2O_3$, $Fe_3O_4$, $MnFe_2O_4$, Cu—Zn ferrite, Ni—Zn ferrite, Mn—Zn—ferrite, Ba ferrite, and Ni—Cu—Zn ferrite.

Examples of the metal nitride include $Fe_2N$, $Fe_3N$, $Fe_4N$, $Fe_{16}N_2$, and $Sm_2Fe_{17}N_3$.

The magnetic material powder may be, for example, spherical, elliptic, disc-shaped, needle-shaped, bar-shaped, flat, tetrapot-shaped, perforated, or porous. In particular, the magnetic material powder is preferably spherical from the standpoint of dispersibility and the like.

The magnetic material powder may be surface-treated with a silane coupling agent. Surface treatment of the magnetic material powder with a silane coupling agent can prevent or reduce aggregation of the magnetic material powder even if a large amount of the magnetic material powder is mixed.

Examples of the silane coupling agent include aminosilanes such as N-phenyl-3-aminopropyltrimethoxysilane, 3-aminopropyltrimethoxysilane, 3-aminopropyltriethoxysilane, 3-(2-aminoethyl)aminopropyltrimethoxysilane, 3-(2- aminoethyl)aminopropylmethyldimethoxysilane, and 3-(2-aminoethyl)aminopropyltriethoxysilane, vinylsilanes such as vinyltrimethoxysilane, vinyltriethoxysilane, and vinyltriacetoxysilane, methacrylic silanes such as 3-methacryloxypropyltrimethoxysilane and 3-methacryloxypropylmethyldimethoxysilane, mercaptosilanes such as 3-mercaptopropyltrimethoxysilane, 3-mercaptopropylmethyldimethoxysilane, and 3-mercaptopropylethoxysilane, epoxysilanes such as 3-glycidoxypropyltrimethoxysilane, 3-glycidoxypropylmethyldimethoxysilane, 3-glycidoxypropyltriethoxysilane, and 3-glycidoxypropylmethyldiethoxysilane, ureidosilanes such as 3-ureidopropyltriethoxysilane, isocyanate silanes such as 3-isocyanatepropyltrimethoxysilane and 3-isocyanatepropyltriethoxysilane, alkylsilanes such as methyltrimethoxysilane, dimethyldimethoxysilane, trimethylmethoxysilane, ethyltrimethoxysilane, n-propyltrimethoxysilane, isopropyldimethoxysilane, isobutyltrimethoxysilane, and cyclohexylmethyldimethoxysilane, and phenyltrimethoxysilane.

Examples of the method for surface-treating the magnetic material powder with a silane coupling agent include a wet method in which the magnetic material powder is treated in a solution in which the magnetic material powder is dispersed, a dry method in which the magnetic material powder is directly treated as powder, or an integral blend method in which the magnetic material powder is treated in a resin composition in which the magnetic material powder is dispersed. Preferred among these is a wet method from the standpoint of preventing or reducing aggregation of the magnetic material powder.

The lower limit of the average particle size of the magnetic material powder is preferably 0.1 µm, and the upper limit thereof is preferably 100 µm.

The magnetic material powder having an average particle size within the above range can further improve the adhesiveness to substrates.

The lower limit of the average particle size of the magnetic material powder is more preferably 0.5 µm, and the upper limit thereof is more preferably 70 µm.

The average particle size can be measured by a laser diffraction-type particle size distribution measurement device, for example.

The lower limit of the amount of the magnetic material powder in the slurry composition of the present invention is preferably 5% by weight, more preferably 10% by weight, and the upper limit thereof is preferably 40% by weight, more preferably 35% by weight.

The slurry composition of the present invention contains a Na ion.

The slurry composition has a Na ion content relative to the polyvinyl acetal resin of 1,000 to 3,000 µg/g.

With the Na ion contained in an amount within the above range, the dispersibility and the dispersion stability can be high in the slurry composition even when poorly dispersible magnetic material powder is used, so that the surface smoothness and the adhesiveness to substrates of the resulting sheet can be enhanced.

The Na ion content relative to the polyvinyl acetal resin is preferably 1,000 µg/g or more, more preferably 1,200 µg/g or more, and preferably 3,000 µg/g or less, more preferably 2,800 µg/g or less.

The Na ion content can be measured by atomic absorption spectrometry, for example.

Examples of the method for adjusting the Na ion content of the slurry composition include a method of adjusting the residual Na ion content of the polyvinyl acetal resin that is a raw material of the polyvinyl acetal resin as a binder, a method of performing refining after neutralization subsequent to acetalization reaction, and a method of adding NaCl during or after acetalization reaction.

The slurry composition of the present invention may contain a resin other than the polyvinyl acetal resin, such as acrylic resin or ethylcellulose as far as it does not impair the effects of the present invention.

The slurry composition of the present invention may further contain a plasticizer, a lubricant, an antistatic agent, and/or the like as far as it does not impair the effects of the present invention.

The slurry composition of the present invention may be produced by any method. For example, the slurry composition may be produced by a method including mixing the polyvinyl acetal resin obtained by acetalizing a raw material polyvinyl alcohol having an adjusted Na ion content, the magnetic material powder, and a material such as an organic solvent and deaerating the mixture. Alternatively, the slurry composition may be produced by a method including mixing the polyvinyl acetal resin whose Na ion content has been adjusted by refinement after acetalization or addition of NaCl during acetalization reaction, the magnetic material powder, and a material such as an organic solvent and deaerating the mixture.

Advantageous Effects of Invention

The present invention can provide a slurry composition in which magnetic material powder has excellent dispersibility and excellent dispersion stability and which enables production of a sheet having high surface smoothness and high adhesiveness to substrates.

DESCRIPTION OF EMBODIMENTS

The present invention is more specifically described in the following with reference to, but not limited to, examples.

Example 1

Preparation of Polyvinyl Acetal Resin

An amount of 500 g of a polyvinyl alcohol resin (degree of saponification 88 mol %, average degree of polymerization 300) was added to 2,500 g of pure water and stirred for about two hours at a temperature of 90° C. for dissolution. This solution was cooled to 40° C., to which was added 10 g of hydrochloric acid having a concentration of 35% by weight. The solution temperature was cooled to 5° C. and 75 g acetaldehyde was added. This temperature was maintained and acetalization reaction was performed to precipitate out a reaction product. The solution was maintained at a solution temperature of 65° C. for five hours to complete the reaction, and 40 g of an aqueous sodium hydroxide solution was added for neutralization reaction. Then, 5,000 g of pure water was added, stirred, and then 5,000 g of water was removed by decantation. Further, the step of adding 5,000 g of pure water, stirring, and removing water by decantation was repeated three times in total. The solid content of the resin was then adjusted to 20% using ion-exchanged water, and 3.6 g of NaCl was added and dissolved, whereby a polyvinyl acetal resin was obtained.

The obtained polyvinyl acetal resin was analyzed by $^{13}$C-NMR (nuclear magnetic resonance spectroscopy) to measure the acetal group content, the hydroxy group content, and the acetyl group content. Table 1 shows the results.

The Na ion content was measured by atomic absorption spectrometry as follows. Specifically, the polyvinyl acetal resin was subjected to acid decomposition treatment and then diluted before analyzed using "AA240FS" produced by Varian Medical Systems, Inc. by the frame method. The results show that the polyvinyl acetal resin had a residual Na ion content relative to the polyvinyl acetal resin of 1,200 µg/g.

Preparation of Slurry Composition

To 50 g of the obtained polyvinyl acetal resin were added 21.4 g of ion-exchanged water, 28 g of ferrite as magnetic material powder, and 0.6 g of glycerol as a plasticizer. They were stirred in a disperser produced by PRIMIX Corporation at 1,200 rpm for 1.5 hours and then deaerated at 1,000 rpm for 30 minutes in a Thinky Mixer produced by Thinky Corporation, whereby a slurry composition was prepared. The ferrite used was Ni—Cu—Zn ferrite (shape: spherical, average particle size: 30 µm).

Example 2

A polyvinyl acetal resin was obtained as in Example 1 except that in (Preparation of polyvinyl acetal resin), a polyvinyl alcohol resin having a degree of saponification of 88 mol % and an average degree of polymerization of 600 was used and the amount of NaCl added was changed to 6 g. Measurement as in Example 1 showed that the acetal group content, the hydroxy group content, and the acetyl group content were as shown in Table 1. The polyvinyl acetal resin had a residual Na ion content of 2,000 µg/g.

A slurry composition was obtained as in Example 1 except that the obtained polyvinyl acetal resin was used.

Example 3

A polyvinyl acetal resin was obtained as in Example 1 except that in (Preparation of polyvinyl acetal resin), the amount of NaCl added was changed to 8.4 g. Measurement as in Example 1 showed that the acetal group content, the hydroxy group content, and, the acetyl group content were as shown in Table 1. The polyvinyl acetal resin had a residual Na ion content of 2,800 µg/g.

A slurry composition was obtained as in Example 1 except that the obtained polyvinyl acetal resin was used.

Example 4

A polyvinyl acetal resin was obtained as in Example 1 except that in (Preparation of polyvinyl acetal resin), a polyvinyl alcohol resin having a degree of saponification of 88 mol and an average degree of polymerization of 4,500 was used, the solid content was adjusted to 10%, and 3.6 g of NaCl was added. Measurement as in Example 1 showed that the acetal group content, the hydroxy group content, and the acetyl group content were as shown in Table 1. The polyvinyl acetal resin had a residual Na ion content of 1,200 µg/g.

A slurry composition was obtained as in Example 1 except that the obtained polyvinyl acetal resin was used.

Example 5

A polyvinyl acetal resin was obtained as in Example 1 except that in (Preparation of polyvinyl acetal resin), a polyvinyl alcohol resin having a degree of saponification of 88 mol % and an average degree of polymerization of 4,500 was used, the solid content was adjusted to 10%, and 8.4 g of NaCl was added. Measurement as in Example 1 showed that the acetal group content, the hydroxy group content, and the acetyl group content were as shown in Table 1. The polyvinyl acetal resin had a residual Na ion content of 2,800 µg/g.

A slurry composition was obtained as in Example 1 except that the obtained polyvinyl acetal resin was used.

Example 6

A polyvinyl acetal resin was obtained as in Example 1 except that in (Preparation of polyvinyl acetal resin), a polyvinyl alcohol resin having a degree of saponification of 88 mol % and an average degree of polymerization of 3,000 was used, the solid content was adjusted to 10%, and 6 g of NaCl was added. Measurement as in Example 1 showed that the acetal group content, the hydroxy group content, and the acetyl group content were as shown in Table 1. The polyvinyl acetal resin had a residual Na ion content of 2,000 µg/g.

A slurry composition was obtained as in Example 1 except that the obtained polyvinyl acetal resin was used.

Example 7

A polyvinyl acetal resin was obtained as in Example 1 except that in (Preparation of polyvinyl acetal resin), a polyvinyl alcohol resin having a degree of saponification of 88 mol % and an average degree of polymerization of 600 was used, the amount of acetaldehyde added was changed to 150 g, and the amount of NaCl added was changed to 6 g. Measurement as in Example 1 showed that the acetal group content, the hydroxy group content, and the acetyl group content were as shown in Table 1. The polyvinyl acetal resin had a residual Na ion content of 2,000 µg/g.

A slurry composition was obtained as in Example 1 except that the obtained polyvinyl acetal resin was used.

Example 8

A polyvinyl acetal resin was obtained as in Example 1 except that in (Preparation of polyvinyl acetal resin), a polyvinyl alcohol, resin having a degree of saponification of 80 mol % and an average degree of polymerization of 600 was used, the amount of acetaldehyde added was changed to 5 g, and the amount of NaCl added was changed to 6 g. Measurement as in Example 1 showed that the acetal group content, the hydroxy group content, and the acetyl group content were as shown in Table 1. The polyvinyl acetal resin had a residual Na ion content of 2,000 µg/g.

A slurry composition was obtained as in Example 1 except that the obtained polyvinyl acetal resin was used.

Example 9

A polyvinyl acetal resin was obtained as in Example 1 except that in (Preparation of polyvinyl acetal resin), a polyvinyl alcohol resin having a degree of saponification of 80 mol % and an average degree of polymerization of 600 was used, and the amount of NaCl added was changed to 6 g. Measurement as in Example 1 showed that the acetal group content, the hydroxy group content, and the acetyl group content were as shown in Table 1. The polyvinyl acetal resin had a residual Na ion content of 2,000 µg/g.

A slurry composition was obtained as in Example 1 except that the obtained polyvinyl acetal resin was used.

Example 10

A polyvinyl acetal resin was obtained as in Example 1 except that in (Preparation of polyvinyl acetal resin), a polyvinyl alcohol resin having a degree of saponification of 99.9 mol % and an average degree of polymerization of 600 was used and the amount of NaCl added was changed to 6 g. Measurement as in Example 1 showed that the acetal group content, the hydroxy group content, and the acetyl group content were as shown in Table 1. The polyvinyl acetal resin had a residual Na ion content of 2,000 µg/g.

A slurry composition was obtained as in Example 1 except that the obtained polyvinyl acetal resin was used.

Example 11

A polyvinyl acetal resin was obtained as in Example 1 except that in (Preparation of polyvinyl acetal resin), a polyvinyl alcohol resin having a degree of saponification of 88 mol % and an average degree of polymerization of 3,000 was used, the solid content was adjusted to 10%, and 6 g of NaCl was added. Measurement as in Example 1 showed that the acetal group content, the hydroxy group content, and the acetyl group content were as shown in Table 1. The polyvinyl acetal resin had a residual Na ion content of 2,000 µg/g.

A slurry composition was obtained as in Example 1 except that the obtained polyvinyl acetal resin was used.

Example 12

A polyvinyl acetal resin was obtained as in Example 1 except that in (Preparation of polyvinyl acetal resin), a polyvinyl alcohol resin having a degree of saponification of 88 mol % and an average degree of polymerization of 5,200 was used, the solid content was adjusted to 10%, and 6 g of NaCl was added. Measurement as in Example 1 showed that the acetal group content, the hydroxy group content, and the acetyl group content were as shown in Table 1. The polyvinyl acetal resin had a residual Na ion content of 2,000 µg/g.

A slurry composition was obtained as in Example 1 except that the obtained polyvinyl acetal resin was used.

Example 13

A polyvinyl acetal resin was obtained as in Example 1 except that in (Preparation of polyvinyl acetal resin), a polyvinyl alcohol resin having a degree of saponification of 78 mol % and an average degree of polymerization of 600 was used and the amount of NaCl added was changed to 6 g. Measurement as in Example 1 showed that the acetal group content, the hydroxy group content, and the acetyl group content were as shown in Table 1. The polyvinyl acetal resin had a residual Na ion content of 2,000 µg/g.

A slurry composition was obtained as in Example 1 except that the obtained polyvinyl acetal resin was used.

Example 14

A slurry composition was obtained as in Example 2 except that $Fe_2O_3$ was used as the magnetic material powder.

Example 15

A polyvinyl acetal resin was obtained as in Example 1 except that in (Preparation of polyvinyl acetal resin), a polyvinyl alcohol resin having a degree of saponification of 88 mol % and an average degree of polymerization of 600 was used, 40 g of n-butyraldehyde was added instead of acetaldehyde, and the amount of NaCl added was changed to 6 g. Measurement as in Example 1 showed that the acetal group content, the hydroxy group content, and the acetyl group content were as shown in Table 1. The polyvinyl acetal resin had a residual Na ion content of 2,000 µg/g.

A slurry composition was obtained as in Example 1 except that the obtained polyvinyl acetal resin was used.

Example 16

A polyvinyl acetal resin was obtained as in Example 1 except that in (Preparation of polyvinyl acetal resin), a polyvinyl alcohol resin having a degree of saponification of 80.5 mol % and an average degree of polymerization of 600 was used, the amount of acetaldehyde added was changed to 2 g, and the amount of NaCl added was changed to 6 g. Measurement as in Example 1 showed that the acetal group content, the hydroxy group content, and the acetyl group content were as shown in Table 1. The polyvinyl acetal resin had a residual Na ion content of 2,000 µg/g.

A slurry composition was obtained as in Example 1 except that the obtained polyvinyl acetal resin was used.

Example 17

A polyvinyl acetal resin was obtained as in Example 1 except that in (Preparation of polyvinyl acetal resin), a polyvinyl alcohol resin having a degree of saponification of 95 mol % and an average degree of polymerization of 600 was used, the amount of acetaldehyde added was changed to 170 g and the amount of NaCl added was changed to 6 g. Measurement as in Example 1 showed that the acetal group content, the hydroxy group content, and the acetyl group content were as shown in Table 1. The polyvinyl acetal resin had a residual Na ion content of 2,000 µg/g.

A slurry composition was obtained as in Example 1 except that the obtained polyvinyl acetal resin was used.

Example 18

A polyvinyl acetal resin was obtained as in Example 1 except that in (Preparation of polyvinyl acetal resin), a polyvinyl alcohol resin having a degree of saponification of 97 mol % and an average degree of polymerization of 600 was used and the amount of NaCl added was changed to 6 g. Measurement as in Example 1 showed that the acetal group content, the hydroxy, group content, and the acetyl group content were as shown in Table 1. The polyvinyl acetal resin had a residual Na ion content of 2,000 µg/g.

A slurry composition was obtained as in Example 1 except that the obtained polyvinyl acetal resin was used.

Example 19

A polyvinyl acetal resin was obtained as in Example 1 except that in (Preparation of polyvinyl acetal resin), a polyvinyl alcohol resin having a degree of saponification of 85 mol % and an average degree of polymerization of 600 was used and the amount of NaCl added was changed to 6 g. Measurement as in Example 1 showed that the acetal group content, the hydroxy group content, and the acetyl group content were as shown in Table 1. The polyvinyl acetal resin had a residual Na ion content of 2,000 µg/g.

A slurry composition was obtained as in Example 1 except that the obtained polyvinyl acetal resin was used.

Example 20

A slurry composition was obtained as in Example 2 except that aluminum powder was used as the magnetic material powder.

Comparative Example 1

A polyvinyl acetal resin was obtained as in Example 1 except that in (Preparation of polyvinyl acetal resin), the amount of NaCl added was changed to 9.6 g. Measurement as in Example 1 showed that the acetal group content, the hydroxy group content, and the acetyl group content were as shown in Table 1. The polyvinyl acetal resin had a residual Na ion content of 3,200 µg/g.

A slurry composition was obtained as in Example 1 except that the obtained polyvinyl acetal resin was used.

Comparative Example 2

A polyvinyl acetal resin was obtained as in Example 1 except that in (Preparation of polyvinyl acetal resin), the amount of NaCl added was changed to 2.4 g. Measurement as in Example 1 showed that the acetal group content, the hydroxy group content, and the acetyl group content were as shown in Table 1. The polyvinyl acetal resin had a residual Na ion content of 800 µg/g.

A slurry composition was obtained as in Example 1 except that the obtained polyvinyl acetal resin was used.

EVALUATION

The slurry compositions obtained in the examples and the comparative examples were evaluated by the following methods. Table 1 shows the results.

(1) Slurry Evaluation (1-1) Particle Size Distribution

The obtained aqueous carbon material composition was stirred in an ultrasonic disperser (produced by SND Co., Ltd., "US-303") for 10 minutes. The particle size distribution was then measured using a laser diffraction-type particle size distribution analyzer (produced by HORIBA, Ltd., "KA-910") to determine the D50 particle size. Similarly, the D50 particle size of the composition after standing at 23° C. for one week was measured. The rate of change in D50 particle size was calculated and evaluated in accordance with the following criteria.

A: The rate of change was less than 30%.
B: The rate of change was 30% or more and less than 60%.
C: The rate of change was 60% or more and less than 100%.
D: The rate of change was 100% or more.

A small rate of change in particle size distribution indicates excellent dispersibility and better storage stability.

(1-2) Settling Test

The solid content of the obtained aqueous carbon material composition was measured. The composition was then centrifuged at 3,000 rpm for 30 minutes using a centrifuge H-18F produced by Kokusan, Ltd. to recover supernatant (90% by volume), and the solid content thereof was measured to calculate the rate of change in solid content before and after centrifugation. The settling properties were evaluated in accordance with the following criteria.

A: The rate of change before and after centrifugation was 95% or more.
B: The rate of change before and after centrifugation was less than 95% and 90% or more.
C: The rate of change before and after centrifugation was less than 90% and 85% or more.
D: The rate of change before and after centrifugation was less than 85%.

Good settling properties indicate excellent storage stability.

(2) Sheet Evaluation

Preparation of Magnetic Material Sheet

The obtained slurry composition was applied to a release-treated polyethylene terephthalate (PET) film to a dried film thickness of 20 µm, dried, and separated from the PET film to prepare a magnetic material sheet.

(2-1) Average Surface Roughness Ra

The average surface roughness Ra of the obtained magnetic material sheet was measured in conformity with JIS B 0601(1994) and evaluated in accordance with the following criteria.

B: Ra was 0.3 µm or more and less than 0.6 µm.
C: Ra was 0.6 µm or more and less than 1.2 µm.
D: Ra was more than 1.2 µm.

A lower surface roughness Ra indicates excellent smoothness and excellent adhesiveness.

(2-2) Sheet Strength

The elongation at break (%) of the obtained magnetic material sheet was measured in conformity with JIS K 7113 using a tensile tester (produced by Shimadzu Corporation, AUTOGRAPH AGS-J) at a tensile speed of 20 mm/min, and evaluated in accordance with the following criteria.

A: The elongation at break was 25% or more and 45% or less.
B: The elongation at break was 15% or more and less than 25%, or more than 45% and 50% or less.
C: The elongation at break was 10% or more and less than 15%, or more than 50% and 55% or less.
D: The elongation at break was less than 10% or more than 55%.

(2-3) Adhesiveness

The obtained slurry composition was applied to float glass to a dried film thickness of 20 µm, and dried to prepare an adhesiveness measurement sample.

The adhesiveness was measured using the obtained measurement sample by a cross-cut test in conformity with JIS K 5400, and evaluated in accordance with the following criteria.

A: None of the squares of the grid was detached.
B: Small flakes of the film were detached at intersections of cuts, and less than 10% of all the grid squares were detached.

C: The film was detached along the cut lines partly, and 10% or more and less than 30% of all the grid squares were detached.

D: The film was detached along the cut lines partly or wholly, and 30% or more of all the grid squares were detached.

TABLE 1

| | Slurry composition | | | | | | | |
|---|---|---|---|---|---|---|---|---|
| | Polyvinyl acetal resin | | | | | | | |
| | Average degree of polymerization | Acetoacetal group content (mol %) | Butyral group content (mol %) | Hydroxy group content (mol %) | Acetyl group content (mol %) | Amount (g) | Na ion content (μg/resin 1 g) | Magnetic material powder Type |
| Example 1 | 300 | 29.0 | — | 59.0 | 12.0 | 50 | 1200 | Ni—Cu—Zn ferrite |
| Example 2 | 600 | 29.0 | — | 59.0 | 12.0 | 50 | 2000 | Ni—Cu—Zn ferrite |
| Example 3 | 300 | 29.0 | — | 59.0 | 12.0 | 50 | 2800 | Ni—Cu—Zn ferrite |
| Example 4 | 4500 | 29.0 | — | 59.0 | 12.0 | 50 | 1200 | Ni—Cu—Zn ferrite |
| Example 5 | 4500 | 29.0 | — | 59.0 | 12.0 | 50 | 2800 | Ni—Cu—Zn ferrite |
| Example 6 | 3000 | 29.0 | — | 59.0 | 12.0 | 50 | 2000 | Ni—Cu—Zn ferrite |
| Example 7 | 600 | 45.0 | — | 43.0 | 12.0 | 50 | 2000 | Ni—Cu—Zn ferrite |
| Example 8 | 600 | 2.0 | — | 78.0 | 20.0 | 50 | 2000 | Ni—Cu—Zn ferrite |
| Example 9 | 600 | 29.0 | — | 51.0 | 20.0 | 50 | 2000 | Ni—Cu—Zn ferrite |
| Example 10 | 600 | 29.0 | — | 70.9 | 0.1 | 50 | 2000 | Ni—Cu—Zn ferrite |
| Example 11 | 3000 | 29.0 | — | 59.0 | 12.0 | 50 | 2000 | Ni—Cu—Zn ferrite |
| Example 12 | 5200 | 29.0 | — | 59.0 | 12.0 | 50 | 2000 | Ni—Cu—Zn ferrite |
| Example 13 | 600 | 29.0 | — | 49.0 | 22.0 | 50 | 2000 | Ni—Cu—Zn ferrite |
| Example 14 | 600 | 29.0 | — | 59.0 | 12.0 | 50 | 2000 | $Fe_2O_3$ |
| Example 15 | 600 | — | 6.0 | 82.0 | 12.0 | 50 | 2000 | Ni—Cu—Zn ferrite |
| Example 16 | 600 | 0.5 | — | 80.0 | 19.5 | 50 | 2000 | Ni—Cu—Zn ferrite |
| Example 17 | 600 | 55.0 | — | 40.0 | 5.0 | 50 | 2000 | Ni—Cu—Zn ferrite |
| Example 18 | 600 | 29.0 | — | 68.0 | 3.0 | 50 | 2000 | Ni—Cu—Zn ferrite |
| Example 19 | 600 | 29.0 | — | 56.0 | 15.0 | 50 | 2000 | Ni—Cu—Zn ferrite |
| Example 20 | 600 | 29.0 | — | 59.0 | 12.0 | 50 | 2000 | Aluminum powder |
| Comparative Example 1 | 600 | 29.0 | — | 59.0 | 12.0 | 50 | 3200 | Ni—Cu—Zn ferrite |
| Comparative Example 2 | 600 | 29.0 | — | 59.0 | 12.0 | 50 | 800 | Ni—Cu—Zn ferrite |

| | Slurry composition | Evaluation | | | | | |
|---|---|---|---|---|---|---|---|
| | Magnetic material powder Added amount (g) | Slurry evaluation | | Sheet evaluation | | | |
| | | Particle size distribution | Settling test | Average surface roughness Ra (μm) | Sheet strength Elongation at break (%) | | Adhesiveness |
| Example 1 | 28 | A | A | 0.894 | C | 23.4 | B | C |
| Example 2 | 28 | A | A | 0.395 | B | 29.9 | A | B |
| Example 3 | 28 | A | B | 0.757 | C | 40.4 | A | B |
| Example 4 | 28 | C | C | 0.887 | C | 38.6 | A | B |
| Example 5 | 28 | C | C | 0.863 | C | 46.9 | B | A |
| Example 6 | 28 | B | B | 0.542 | B | 32.3 | A | B |
| Example 7 | 28 | A | A | 0.896 | C | 47.3 | B | A |
| Example 8 | 28 | A | A | 0.246 | A | 16.5 | B | C |
| Example 9 | 28 | A | A | 0.446 | B | 37.2 | A | B |
| Example 10 | 28 | A | A | 0.496 | B | 12.3 | C | C |
| Example 11 | 28 | B | B | 0.555 | B | 42.8 | B | B |
| Example 12 | 28 | C | C | 1.150 | C | 53.7 | C | B |
| Example 13 | 28 | A | A | 1.089 | C | 54.5 | C | B |
| Example 14 | 28 | A | A | 0.498 | B | 31.0 | A | B |
| Example 15 | 28 | B | B | 0.478 | B | 40.2 | A | B |
| Example 16 | 28 | B | B | 0.346 | B | 10.1 | C | C |
| Example 17 | 28 | B | B | 0.962 | C | 50.2 | C | C |
| Example 18 | 28 | A | A | 0.480 | B | 17.2 | B | B |
| Example 19 | 28 | A | A | 0.382 | B | 31.3 | A | B |
| Example 20 | 28 | C | C | 0.918 | C | 51.3 | C | C |
| Comparative Example 1 | 28 | D | D | 1.204 | D | 56.3 | D | D |
| Comparative Example 2 | 28 | D | D | 1.571 | D | 6.6 | D | D |

INDUSTRIAL APPLICABILITY

The present invention can provide a slurry composition in which magnetic material powder has excellent dispersibility and excellent dispersion stability and which enables production of a sheet having high surface smoothness and high adhesiveness to substrates.

The invention claimed is:

1. A slurry composition comprising:
   a polyvinyl acetal resin;
   magnetic material powder; and
   a Na ion,
   the slurry composition having a Na ion content of 1,000 to 3,000 µg/g relative to the polyvinyl acetal resin, and
   the slurry composition containing the polyvinyl acetal resin in an amount of 20 to 65% by weight.

2. The slurry composition according to claim 1, wherein the polyvinyl acetal resin has an average degree of polymerization of 200 to 5,000.

3. The slurry composition according to claim 1, wherein the polyvinyl acetal resin has an acetal group content of 1 to 50 mol %.

4. The slurry composition according to claim 1, wherein the polyvinyl acetal resin has an acetyl group content of 1 to 20 mol %.

* * * * *